April 15, 1924.
W. E. DAVIS
1,490,598
COMBINED MILK FILTER AND COOLER
Filed Dec. 6, 1922
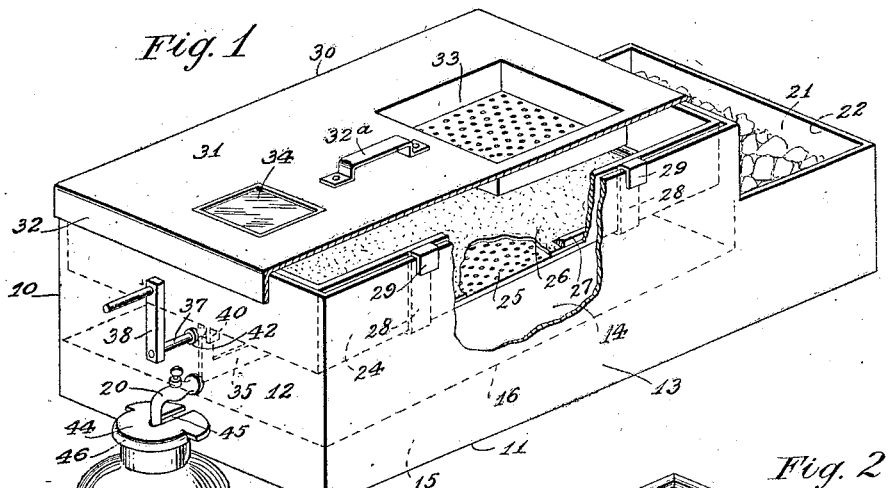
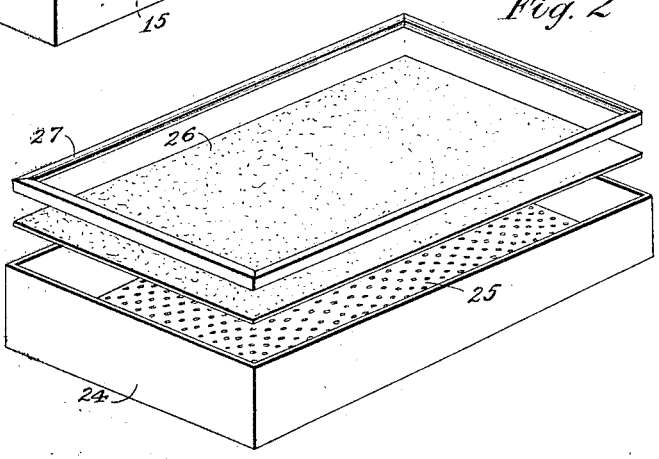
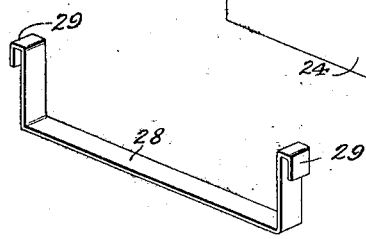
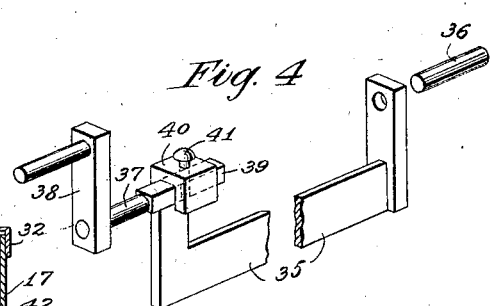
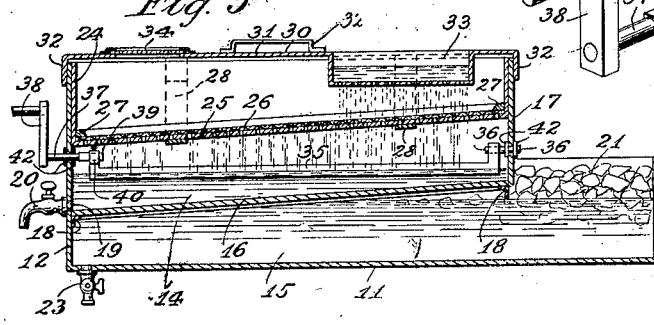
INVENTOR.
William E. Davis
BY H. G. Manning.
ATTORNEY Patented Apr. 15, 1924.

1,490,598

UNITED STATES PATENT OFFICE.

WILLIAM E. DAVIS, OF WATERBURY, CONNECTICUT.

COMBINED MILK FILTER AND COOLER.

Application filed December 6, 1922. Serial No. 605,199.

*To all whom it may concern:*

Be it known that I, WILLIAM E. DAVIS, a citizen of the United States, and a resident of Waterbury, county of New Haven, and State of Connecticut, have invented certain new and useful Improvements in Combined Milk Filters and Coolers, of which the following is a specification.

This invention relates to cooling apparatus, and more particularly to a combined milk filter and cooler which may be used in removing the animal heat from milk preparatory to putting it into milk cans in which it may be thereafter further cooled and transported.

One object of the invention consists in the provision of a milk compartment superimposed on an ice compartment and separated therefrom by an inclined floor, the milk on the upper surface of the floor being cooled by the ice and water below said floor.

A further object is to provide an apparatus of the above nature in which the ice compartment projects beyond the end of the milk compartment and is provided with an opening through which the melted ice may be replenished.

A further object is to provide filtering means comprising a perforated filter-box to be set into the upper part of the milk compartment, a flannel or filter sheet, and means to hold the filter sheet in position in said filter box.

A further object is to provide a pair of U-shaped supports or cradles for the filter-box, the cradles having downturned hooks to engage over the upper edges of the walls of the milk compartment.

A further object is to provide a cover for the milk compartment having a perforated milk inlet and a window through which the inside of the filter-box may be seen.

A further object is to provide a dust-cap for the top of a milk can into which the milk may be drawn off, said dust-cap being shaped to fit the spigot comprising the milk outlet for the milk compartment.

A still further object of the invention is to provide improved means for the purpose specified, which will be simple, cheap to manufacture, easy to assemble and take apart, and very efficient and durable in use.

With these and other objects in view, there has been illustrated on the accompanying drawings one form in which the invention may be conveniently embodied in practice.

Fig. 1 represents a perspective view of the apparatus, parts being broken away to show the underlying structure.

Fig. 2 is a perspective view of the filter box, the flannel sheet, and the sheet-holding frame, the parts being separated in order to show their relative positions.

Fig. 3 is a perspective view of one of the U-shaped supports or cradles by which the filter box is supported above the milk compartment.

Fig. 4 is a perspective view, with parts broken away, of the agitating device located in the milk compartment.

Fig. 5 is a sectional side elevation of the complete apparatus.

Referring now to the drawings in which like reference numerals denote corresponding parts throughout the several views, the preferred form of the apparatus comprises a box-like member 10 of suitable material such, for example, as galvanized iron, and having a bottom 11, a front wall 12 and side walls 13. The upper part of the member 10 serves as a compartment 14 in which the milk or other liquid to be cooled is received. This milk compartment 14 is separated from an ice compartment 15, in the lower part of the member 10 by means of a forwardly and downwardly inclined floor 16. The floor 16 is bounded at the front and sides by the walls 12 and 13 and at the rear by a wall 17 which serves as the rear wall of the milk compartment 14. The inclined floor 16 may be supported by means of a frame 18 attached to the front wall 12 and side walls 13.

After the animal heat has been removed, the milk may be drawn through an opening 19 in the front wall 12 of the milk compartment, adjacent the floor 16, the flow being controlled by a spigot 20.

For convenience in replenishing the broken or chipped ice in the ice compartment 15, the latter is extended to the rear of the wall 17 to form an ice-receiving portion 21 having a rear wall 22. When it becomes desirable to drain water from the ice compartment 15, this may be done by means of a drain-cock 23 provided for that purpose in the bottom 11.

To prevent extraneous matter from entering the milk compartment 14, with the milk, provision is made of a filter box 24. The filter box 24 has an inclined perforated or foraminated bottom 25, upon which a sheet or filter member 26 of flannel or any other suitable material is held in place by a frame 27, preferably of galvanized iron. The filter box 24 is supported by means of a pair of U-shaped supports or cradles 28 extending under the filter box across the milk compartment 14. The cradles 28 have their arms bent outwardly and downwardly to form hooks 29, to engage over the upper edges of the side walls 13 of the box-like member 10.

When the apparatus is in use, the upper part of the milk compartment is closed by a cover 30 having a generally flat top 31 and a downturned edge flange 32 to fit over the front and back walls 12 and 17 and to cover the hooks 29. The cover 30 is provided with a handle 32$^a$ and also has a downwardly depressed perforated inlet 33 through which milk may be delivered to the filter box. The cover 30 is also provided with a window 34 of any suitable transparent material, such as glass, and through which the condition of the inside of the filter box 24 may be observed.

In operation, the milk, after it has been filtered by the filter box, enters the lower part of the milk compartment 14, and is cooled by contact with the floor 16, the latter in turn being cooled by the ice water in the ice compartment 15.

In order to hasten the cooling as well as to thoroughly mix the milk before it is drawn off through the spigot 20, a U-shaped agitator 35 is provided. This agitator 35 extends sustantially the full length of the milk compartment, and has its rear arm mounted on a pin 36 extending through the rear wall 17 of the milk compartment. The front arm of the agitator 35 is adjustably mounted on a mandrel pin 37 passing through an opening in the front wall 12 and having a handle 38 at its forward end. The pin 37 preferably has a squared inner end 39 which fits into a hook-shaped portion 40 of the front arm. The handle 38 and the agitator 35 are secured together in any suitable manner as by a pin 41, which passes through alined openings in the hook-shaped portion 40 and the squared end 39 of the pin 37 respectively. Suitable means, such as rubber washers 42 may be used to prevent leakage around the pins 36 and 37.

In operation, when a milk can 43 is to be filled from the spigot 20, the mouth of the can is covered with a dust cap 44 as shown in Fig. 1. The dust cap 44 has a slot 45 to receive the end of the spigot and a flange 46 extends downwardly from the front of the cap, to assist in keeping the cap in place.

It will be understood that many variations may be resorted to within the scope of the invention, and portions of the improvements may be used without others.

While there has been disclosed in this specification, one form in which the invention may be conveniently embodied in use, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a milk-cooling apparatus, the combination with a milk compartment having a forwardly and downwardly inclined floor, of means for cooling milk in said compartment, and means for agitating the milk comprising a U-shaped member having its legs pivotally mounted at the front and rear of said compartment, and a handle outside the casing connected with the front leg of the U-shaped member.

2. In a milk-cooling apparatus, the combination with a milk compartment having a floor downwardly inclined toward the front and a front outlet adjacent said floor, of means for cooling said floor, and a forwardly and downwardly inclined filter extending across said compartment, the milk delivered to said apparatus being adapted to flow by gravity through said filter and into said milk compartment.

3. In a milk-cooling apparatus, the combination with a milk compartment having a floor downwardly inclined toward the front and a front outlet adjacent said floor, of means for cooling said floor, a filter box with a perforated floor supported in the upper part of said compartment, a filter sheet to cover said perforated floor, and a frame to fit into said filter box and hold down the edges of said filter sheet, the milk delivered to said apparatus being adapted to flow by gravity through said filter box into said milk compartment.

4. In a milk-cooling apparatus, the combination with a milk compartment having front, rear, and side walls, of means for cooling milk in said compartment, milk filtering means comprising a filter box in the upper part of said compartment, and supporting means for said filter box comprising U-shaped supports having the ends of their legs bent outwardly to engage the upper edges of two opposite walls of said compartment, the milk delivered to said apparatus being adapted to flow by gravity through said filter box into said milk compartment.

5. In a milk-cooling apparatus, the combination with a milk compartment, of means for cooling milk in said compartment, a filter extending across said compartment, and a cover for said compartment having a milk inlet and a window through which the condition of the filter may be observed, the milk delivered to said apparatus being adapted to flow by gravity through said filter box into said milk compartment.

6. In a milk-cooling apparatus, the combination with a milk compartment, of means for cooling milk in said compartment, a filter extending across said compartment, and a cover for said compartment having a milk inlet formed by a downwardly depressed perforated portion, and a window to give a view of the filter, the milk delivered to said apparatus being adapted to flow by gravity through said filter box into said milk compartment.

7. In a milk-cooling apparatus, the combination with a milk compartment having front, rear, and side walls, of means for cooling milk in said compartment, filter means comprising a filter-box extending across said compartment, U-shaped filter-box supports having the ends of their legs turned outwardly and downwardly forming hooks to engage the upper edges of the side walls, and a cover for said compartment having a milk inlet and downwardly extending flanges to fit over said front and rear walls and the hooks on the side walls, the milk delivered to said apparatus being adapted to flow by gravity through said filter box into said milk compartment.

8. In a milk-cooling apparatus, the combination with a milk compartment having front, side, and rear walls, a forwardly and downwardly inclined floor, and a front outlet adjacent said floor, of means for cooling the milk in said milk compartment, and milk-agitating means comprising a U-shaped member having one leg pivotally mounted on said rear wall and the other leg bent at its end to form a hook with a square opening, a pin journalled in said front wall and having a squared rear end to fit into said square opening, and a handle secured on said pin in front of said front wall.

9. In a milk cooling and filtering apparatus, a cooling chamber having agitating means therein, means for withdrawing heat from said cooling chamber, a filtering chamber superposed upon said cooling chamber, a cover for said filtering chamber having a milk inlet whereby the milk delivered through said inlet will be caused to flow by gravity from said filtering chamber into said cooling chamber and be agitated and cooled without exposure to the dust laden atmosphere.

In testimony whereof, I have affixed my signature to this specification.

WILLIAM E. DAVIS.